United States Patent [19]

McDaniel et al.

[11] Patent Number: 5,283,301

[45] Date of Patent: Feb. 1, 1994

[54] OLEFIN POLYMERIZATION WITH PARTICULATE GEL-CONTAINING CATALYST

[75] Inventors: Max P. McDaniel, Bartlesville; Gil R. Hawley, Dewey, both of Okla.

[73] Assignee: Phillips Petroleum Company, Bartlesville, Okla.

[21] Appl. No.: 76,973

[22] Filed: Jun. 16, 1993

Related U.S. Application Data

[62] Division of Ser. No. 749,187, Aug. 23, 1991, Pat. No. 5,246,900.

[51] Int. Cl.$^5$ .......................... C08F 4/643; C08F 4/02
[52] U.S. Cl. .................................... 526/124; 526/123; 526/352; 502/103; 502/106; 502/132; 502/208
[58] Field of Search ................ 526/123, 124, 352; 502/103, 106, 132, 208

[56] References Cited

U.S. PATENT DOCUMENTS

| 3,072,633 | 1/1963 | Cawthon et al. | 260/94.9 |
|---|---|---|---|
| 3,214,417 | 10/1965 | Bloyaert et al. | 260/88.2 |
| 3,371,079 | 2/1968 | Peters et al. | 260/94.9 |
| 3,594,330 | 7/1971 | Delbouille et al. | 252/429 |
| 3,943,067 | 3/1976 | Chan et al. | 252/430 |
| 4,148,754 | 4/1979 | Strobel et al. | 252/429 C |
| 4,173,547 | 11/1979 | Graff | 252/429 B |
| 4,233,182 | 11/1980 | Hoff et al. | 526/124 X |
| 4,284,748 | 8/1981 | Welch | 526/119 |
| 4,289,863 | 9/1981 | Hill et al. | 526/154 X |
| 4,333,851 | 6/1982 | Speakman et al. | 252/429 B |
| 4,397,765 | 8/1983 | McDaniel | 252/430 |
| 5,104,837 | 4/1992 | Hawley et al. | 526/124 X |

FOREIGN PATENT DOCUMENTS 1381947  11/1964  France .................. 526/124

*Primary Examiner*—Fred Teskin
*Attorney, Agent, or Firm*—Dougherty, Hessin, Beavers & Gilbert

[57] ABSTRACT

Olefin polymerization catalysts and processes for preparing and using the catalysts are provided. The catalysts are prepared by forming a particulate gel containing aluminum and magnesium phosphates, calcining the gel and then contacting the calcined gel with a titanium halide and, optionally, an organomagnesium compound.

16 Claims, No Drawings

OLEFIN POLYMERIZATION WITH PARTICULATE GEL-CONTAINING CATALYST

This is a divisional of copending application Ser. No. 07/749,187, filed on Aug. 23, 1991, now U.S. Pat. No. 5,246,900.

BACKGROUND OF THE INVENTION

1. Field of the Invention

The present invention relates to polymerization catalysts, processes for preparing such catalysts and processes for polymerizing or copolymerizing olefins using the catalysts.

2. Description of the Prior Art

It is known that olefin polymers can be prepared in the presence of catalysts comprised of titanium halides supported on support compounds such as magnesium oxide, magnesium chloride, aluminum oxychloride and the like. For example, U.S. Pat. No. 4,061,857 issued on Dec. 6, 1977 discloses a solid catalyst containing a titanium compound and an organoaluminum compound prepared by milling together a magnesium halide, an aluminum oxyhalide and titanium tetrachloride.

U.S. Pat. No. 4,173,547 issued Nov. 6, 1979 discloses a catalyst for preparing polymers of predetermined particle size and distribution comprised of an organoaluminum compound, an organomagnesium compound and a titanium compound, e.g., titanium tetrachloride, on an inorganic porous solid particulate carrier material. The aluminum, magnesium and titanium components are distributed and absorbed onto the inorganic carrier material in separate steps.

While the foregoing and other catalysts containing titanium chloride have been used successfully, there is a constant search for improved or different catalysts for bringing out improved or different desired results. By the present invention, an improved catalyst is provided comprised of titanium halide or titanium halide and an organo magnesium compound supported on a gel containing aluminum and magnesium phosphates. The catalyst is useful for the production of ultra high molecular weight olefin polymers.

SUMMARY OF THE INVENTION

A process for preparing a polymerization catalyst comprised of titanium halide supported on a gel containing aluminum and magnesium phosphates is provided. The process comprises forming a particulate gel containing aluminum and magnesium phosphates, calcining the gel and then contacting the calcined gel with a titanium halide to obtain the catalyst. In addition to the titanium halide, the calcined gel can optionally be contacted with an organomagnesium compound to provide a catalyst containing both titanium and magnesium supported on a gel containing aluminum and magnesium phosphates.

The particulate gel containing aluminum and magnesium phosphates can be formed by combining an aluminum salt, a magnesium salt and a monobasic phosphate in an aqueous solvent to form a solution, precipitating a gel from the solution by adding a base thereto and then recovering and drying the gel. In an alternate technique, an organoaluminum compound and an organomagnesium compound can be combined in a hydrocarbon solvent to form a solution, precipitated in a gel by adding a phosphoric acid solution thereto and the gel recovered and dried.

Polymerization catalysts comprising titanium halide and optionally, an organomagnesium compound, supported on an aluminum and magnesium phosphate gel, and processes for producing polyolefins utilizing such catalysts are also provided.

It is, therefore, a general object of the present invention to provide polymerization catalysts and processes of making and using the same.

A further object of the present invention is the provision of processes for preparing polymerization catalysts comprised of titanium halide and, optionally, an organomagnesium compound, supported on a particulate gel containing aluminum and magnesium phosphates.

Another object of the present invention is the provision of polymerization catalysts comprised of titanium halide and, optionally, an organomagnesium compound, supported on a particulate gel containing aluminum and magnesium phosphates, and processes of using such catalysts for preparing high molecular weight polyolefins.

Other and further objects, features and advantages of the present invention will be readily apparent to those skilled in the art upon a reading of the description of preferred embodiments which follows.

DESCRIPTION OF PREFERRED EMBODIMENTS

The process of the present invention for preparing an olefin polymerization catalyst comprised of titanium halide or titanium halide and organomagnesium compound supported on a gel containing aluminum and magnesium phosphates is comprised of the steps of forming a particulate gel containing aluminum and magnesium phosphates, calcining the gel and contacting the calcined gel with titanium halide or titanium halide and an organomagnesium compound.

In carrying out the step of forming a particulate gel containing aluminum and magnesium phosphates, an aluminum salt, a magnesium salt and a monobasic phosphate compound are combined in an aqueous solvent to form a solution. A gel is then precipitated from the solution by adding a base thereto. The gel is recovered by filtration and dried.

The aluminum and magnesium salts are preferably aluminum nitrate and magnesium chloride, and the monobasic phosphate compound is preferably monobasic ammonium phosphate. The gel is preferably precipitated from the aqueous solution of such compounds by adding an aqueous ammonium hydroxide solution thereto. After precipitation, the gel is preferably washed in an organic alcohol such as isopropanol, recovered by filtration, dried in a vacuum oven and screened to the desired particle size.

In an alternate technique, the gel can be formed by combining in a hydrocarbon solvent an aluminum alkoxide compound of the formula $Al(RO)_3$ wherein R represents an alkyl radical having from 2 to 8 carbon atoms and a magnesium alkoxide compound of the formula $Mg(R'O)_2$ or $MgR'(OR')$ wherein R' represents an alkyl radical having from 2 to 8 carbon atoms. A gel is precipitated from the solution by adding phosphoric acid thereto, and the gel is then recovered and dried. Preferably, the gel is isolated by filtration, dried in a vacuum oven and screened.

The aluminum alkoxide compound is preferably aluminum triethoxide and the magnesium alkoxide compound is preferably magnesium diethoxide. Of the various hydrocarbon solvents which can be used, isopropyl alcohol is preferred.

Regardless of the particular gel forming technique used, the quantities of aluminum, magnesium and phosphorus utilized are measured such that the weight ratio of aluminum to magnesium in the gel is in the range of from about 100:1 to about 1:1, preferably from about 10:1 to about 2:1. The weight ratio of phosphorus to aluminum in the gel is in the range of from about 0.5:1 to about 2:1, preferably from about 0.6:1 to about 1.2:1, and the weight ratio of phosphorus to magnesium is in the range of from about 100:1 to about 0.5:1, preferably from about 10:1 to about 1:1. Most preferably, the gel contains a weight ratio of aluminum to magnesium of about 5:1, a weight ratio of phosphorus to aluminum of about 0.9:1 and a weight ratio of phosphorus to magnesium of about 5:1.

The titanium halide is preferably deposited on the gel support in an amount whereby the weight ratio of titanium halide to the gel is in the range of from about 0.4:1 to about 1.4:1. When an organomagnesium compound is also deposited on the gel, it is preferably a magnesium dialkyl compound of the formula $MgR''_2$ wherein $R''$ represents an alkyl radical having from 2 to 8 carbon atoms, and it is preferably deposited on the gel in an amount whereby the weight ratio of magnesium dialkyl compound to titanium halide is in the range of from about 5:1 to about 0.5:1. The preferred titanium halide is titanium tetrachloride and the preferred magnesium dialkyl compound is magnesium dibutyl. When magnesium dibutyl is deposited on the gel with titanium tetrachloride, the weight ratio of magnesium dibutyl to titanium tetrachloride is preferably about 1.1:1.

The step of calcining the gel containing aluminum and magnesium phosphates is preferably carried out by heating the dried and screened gel in the presence of air to a temperature in the range of from about 150° C. to about 600° C. for a time period in the range of from about 1 hour to about 10 hours. Most preferably, the dried gel is screened through a 35 mesh screen and calcined by contact with dry air in a fluidized bed at a temperature of about 300° C. for a time period of about 3 hours.

The deposit of the titanium halide on the calcined gel can be accomplished by dispersing the calcined gel in a hydrocarbon liquid such as n-heptane and adding the titanium halide to the dispersion. The dispersion is then heated and refluxed for a time period sufficient to thoroughly contact the gel with the titanium halide, e.g., for a time period of from about 30 minutes to 1 hour. The resulting catalyst is separated from the hydrocarbon liquid and dried.

An alternate technique for contacting the calcined gel with the titanium halide is to contact the gel with titanium halide vapor contained in an argon stream at about 200° C. in a fluidized bed for a time sufficient for the titanium halide to be deposited on the gel.

The polymerization catalysts of this invention are generally comprised of titanium halides supported on an aluminum and magnesium phosphate gel. The catalyst can optionally include an organomagnesium compound in addition to the titanium halide, preferably a magnesium dialkyl compound. The most preferred such magnesium dialkyl compound is magnesium dibutyl. The polymerization catalysts are prepared and include the weight ratios of components as described above.

The titanium halide or titanium halide and organomagnesium compound supported on a gel containing aluminum and magnesium phosphates can be employed in various olefin polymerization processes wherein at least one 1-olefin monomer having from 2 to about 8 carbon atoms is contacted with the catalyst under polymerization conditions. The polymerization can be carried out in a dry inert hydrocarbon solvent such as isobutane, n-heptane, methylcyclohexane or benzene at a reactor temperature in the range of from about 60° C. to about 110° C. and a reactor pressure in the range of from about 250 psig to about 600 psig. The polymer produced can be recovered, treated with carbon dioxide or water, for example, to deactivate residual catalysts, stabilized with an antioxidant such as butylated hydroxytoluene, and dried by conventional methods to obtain the final polymer product. Hydrogen can be used in the reactor as known in the art.

In order to further illustrate the preparation and use of the catalysts of the present invention, the following examples are given. The particular components and catalysts utilized in the examples are meant to be illustrative of the present invention and not limiting thereto.

EXAMPLE I

A series of catalysts comprising $TiCl_4$ and a particulate cogelled xerogel of aluminum-magnesium phosphate was prepared at a pH of about 6–10 by combining aqueous solutions of aluminum nitrate, magnesium chloride, monobasic ammonium phosphate and ammonium hydroxide. Generally, each catalyst was made by slurrying the gel in n-heptane, adding sufficient $TiCl_4$ to obtain the desired weight ratio of $TiCl_4$ to gel, i.e., a weight ratio within the range of from about 0.4:1 to about 1.4:1, refluxing the mixture for about 30 minutes and cooling to about room temperature. Supernatant liquid was decanted, the slurry was washed with n-heptane to remove unreacted $TiCl_4$ and the solvent was removed from the catalyst by evaporation in a dry box under nitrogen or argon.

The gel supports and catalysts which were prepared are specifically described as follows:

Catalyst No. 1

An aqueous solution was made by stirring and heating 50 mL of deionized water, 93.8 g (0.250 mole) of $Al(NO_3)_3 \cdot 9H_2O$, 50.8 g (0.250 mole) of $MgCl_2 \cdot 6H_2O$, and 40.3 g (0.350 mole) of $NH_4H_2PO_4$. A neutral gel was formed by adding to the salt solution about 90 mL (about 13.8 moles of $NH_3$) of a concentrated solution of ammonium hydroxide in water. After standing overnight, the gel was stirred for 1 hour at 75° C. in 2 L of water containing about 20 mL of the $NH_4OH$ and filtered. The gel was then slurried in 2 L of isopropanol at about 75° C. and recovered by filtration. The gel was dried in a vacuum oven at 80° C. and screened through a 35 mesh screen before calcining it under fluid bed conditions in dry air at 300° C. for 3 hours. The recovered gel was flushed with $N_2$ and stored under $N_2$ pending further use. The calculated weight ratios of the gel components are: Al/Mg of 1:1, P/Al of 1.4:1 and P/Mg of 1.4:1.

The catalyst was prepared by slurrying 2.4 g of the above described gel in n-heptane, adding to it 2.0 mL (3.45 g) of $TiCl_4$ and refluxing the mixture for about ½ hour. The catalyst was isolated by decanting supernatant liquid, washing the solids with n-heptane to remove unreacted $TiCl_4$ and allowing the solvent to evaporate from the washed catalyst as it remained undisturbed in a dry box. The weight ratio of $TiCl_4$ to gel in the catalyst is 1.4:1.

Catalyst No. 2

The gel support was prepared in the same manner as described above for Catalyst No. 1. The quantities of components employed, however, were: 140.7 g (0.375 mole) of $Al(NO_3)_3.9H_2O$, 25.4 g (0.125 mole) of $MgCl_2.6H_2O$, 46.0 g (0.400 mole) of $NH_4H_2PO_4$ and about 87 mL (13.3 moles) of $NH_4OH$. The gel support was recovered and calcined as before. The calculated weight ratios of the gel components are: Al/Mg of 3:1, P/Al of 1.1:1 and P/Mg of 3.2:1.

The catalyst was prepared by slurrying 7.8 g of the gel in n-hexane, adding 2.0 mL of $TiCl_4$ then refluxing and recovering the product as before. The weight ratio of $TiCl_4$ to gel in the catalyst was 0.44:1.

Catalyst No. 3

The gel support was prepared in the same manner described above for catalyst No. 1. The quantities of components employed, however, were: 168.8 g (0.500 mole) of $Al(NO_3)_3.9H_2O$, 9.1 g (0.045 mole) of $MgCl_2.6H_2O$, 49.2 g (0.428 mole) of $NH_4H_2PO_4$ and about 97 mL (14.8 moles) of $NH_4OH$. The support was recovered and calcined as before. The calculated weight ratios of the gel components are: Al/Mg of 10:1, P/Al of 0.9:1 and P/Mg of 9.5:1.

The catalyst was prepared by slurrying 2.9 g of the gel in n-hexane, adding 2.0 mL of $TiCl_4$, then refluxing and recovering the product as before. The weight ratio of $TiCl_4$ to gel in the catalyst was 1.2:1.

Catalyst No. 4

This catalyst was prepared by slurrying 3.0 g of the gel prepared for Catalyst No. 3 described above in n-hexane, admixing 0.71 g (0.0051 mole) of magnesium dibutyl (as a 12.6 wt. % solution in n-heptane) and refluxing the mixture for about 30 minutes. The solvent was evaporated under an argon purge, the dry material was admixed with n-heptane, liquid was decanted and the solids dried by evaporation as before. The product was again slurried in n-heptane, admixed with 2.0 mL of $TiCl_4$ and then refluxed and recovered. The calculated weight ratio of $TiCl_4$ to the magnesium dibutyl and gel was about 1.1:1.

EXAMPLE II

Ethylene polymerizations were conducted in a clean, dry, air-free, stirred, stainless steel reactor of about a 2 L capacity containing about 600 g of isobutane as diluent. The catalyst charges ranged from about 0.03 to about 0.3 g, and in each run, 1 mmole of triethylaluminum, as a 25 weight percent solution in n-heptane, was added. The reactor and its contents, i.e., catalyst, triethylaluminum, diluent and hydrogen, if used, were heated to 85° C., ethylene was pressured in to give about 565 psia (3.9 MPa) and the run was started.

Each run was terminated by stopping the ethylene flow and venting the gaseous reactor contents to a flare line for disposal. The polymer was recovered, dried and weighed to determine catalyst productivity which is expressed or calculated in terms of grams of polyethylene per gram of solid catalyst per hour.

Melt index (MI), g/10 min, was determined in accordance with ASTM D 1238 (Condition E).

High load melt index (HLMI), g/10 min, was determined in accordance with ASTM D 1238 (Condition F).

Density, g/cc, was determined in accordance with ASTM D 1505.

Melt viscosity data were obtained by means of a Rheometrics Dynamic Spectrometer (RDS) at 230° C. using parallel plate geometry. Strain amplitude was 5%, nitrogen gas was used in the sample chamber and the oscillatory frequency was varied from 0.1 to 500 radian/second. The data obtained give storage modulus and loss modulus as a function of oscillatory frequency. From these data was calculated dynamic complex viscosity/$\eta^*$/as described in Chapter 1 of the "Viscoelastic Properties of Polymers", by Ferry, published in 1961 by Wiley. The values obtained are directly related to polymer molecular weight. The higher the value the higher the molecular weight. It has been shown for a commercially available ultra high molecular weight polyethylene (UHMWPE) that /$\eta^*$/ when determined at 0.1 radian/second and 190° C. has a value of about 30 MPoise. Higher values then indicate even higher molecular weight polymer.

The results obtained are given in Table 1 below.

TABLE 1

| Catalyst | | Ethylene Polymerization at 85° C. | | | | |
|---|---|---|---|---|---|---|
| | Weight | Run | | Calculated Produc- | Den- | HLMI | Melt Visco- |
| No. | Ratio Al/Mg | No. | Time Min. | tivity g/g cat/hr | sity g/cc | g/10 min | sity M Poise |
| 1 | 1:1 | 1 | 43 | 500[a] | 0.9401 | 0 | 78 |
| 2 | 3:1 | 2 | 60 | 1320 | 0.9388 | 0 | 49 |
| 3 | 10:1 | 3 | 60 | 1310 | 0.9379 | 0 | 44 |
| 3 | 10:1 | 4[b] | 62 | 577 | 0.9524 | 0.12 | 9.5 |
| 4 | 10:1 | 5 | 60 | 4830 | 0.9394 | 0 | 42 |

[a] a productivity of 360 g polyethylene per g catalyst per 43.2 minutes was determined. Assuming a linear response for up to 60 minutes the calculated productivity for a 60 minute run equals 360 g/43.2 min × 60 min divided by 43.2 min = 500 g/60 min.
[b] Run in the presence of 50 psi hydrogen.

The data set forth in Table 1 demonstrates that active ethylene polymerization catalysts result when $TiCl_4$ and optionally, an organomagnesium compound, are supported on a calcined gel containing aluminum and magnesium phosphates. The productivity data in runs 1 and 2 suggest that more active polymerization catalysts result when the weight ratio of Al/Mg is increased from 1:1 to 3:1. Increasing the ratio to 10:1 (as in run 3) resulted in a catalyst exhibiting similar activity and producing polymer of similar molecular weight as the catalyst of run 2.

In the absence of reactor hydrogen, the catalysts in runs 1, 2 and 3 each produced ultrahigh molecular weight polyethylene as shown by the zero HLMI results and particularly by the melt viscosity values in excess of 40 Mpoise. A commercially available UHMWPE identified as Hostalen GUR (American Hoechst), for example, has a melt viscosity of about 35 Mpoise under the same test conditions as employed herein.

In the presence of reactor hydrogen (run 4), the measurable HLMI result of 0.12 g/10 minutes and substantially lower melt viscosity results of only 9.5 Mpoise indicate that much lower molecular weight polymer was produced. The polymer, however, can still be characterized as high molecular weight polymer in view of the fractional HLMI result. As expected, with decreasing molecular weight, polymer density increased from about 0.94 g/cc to about 0.95 g/cc.

The good productivity results of 4860 g/g cat/hr shown in run 5 indicate that catalyst activity can be boosted by about 3.5 fold by contacting the aluminum-magnesium phosphate gel with magnesium dibutyl prior to contacting the gel with TiCl$_4$. The catalyst, however, still produced UHMWPE under the polymerization conditions employed having a density of about 0.94 g/cc.

EXAMPLE III

An aluminum-magnesium phosphate gel was made in an essentially nonaqueous solution by dissolving 20 g (0.23 mole) of magnesium diethoxide and 20 g (0.076 mole) of aluminum triethoxide in 500 mL of isopropanol. The solution was admixed with 4.2 mL (0.062 mole) of 85% H$_3$PO$_4$ to precipitate a gel which was isolated by filtration, dried in a vacuum oven and calcined in a fluidized bed for 6 hours in air at 300° C. The dry, calcined gel (10 g) was treated with 1.7 g of TiCl$_4$ vapor at 200° C. in an argon stream in a fluidized bed to obtain the catalyst. The weight ratios of the components in the catalyst were Al/Mg of about 0.4:1, P/Al of about 0.6:1 and P/Mg of about 0.3:1.

The catalyst (0.6089 g) was employed in polymerizing ethylene in a 1 gal (3.8 L) reactor in isobutane in the presence of 100 psi H$_2$ and 1 mmole of triisobutylaluminum at a temperature of 80° C. and a reactor pressure of about 485 psia. In a 60 minute run the catalyst produced 160 g of polyethylene having a HLMI of about 123 and a MI of about 1.35. The calculated productivity was about 263 g polymer per g solid catalyst per hour.

The present invention, therefore, is well adapted to carry out the objects and attain the ends and advantages mentioned as well as those which are inherent therein. While presently preferred embodiments are described herein for purposes of disclosure, numerous changes may be made by those skilled in the art which are encompassed within the spirit of this invention as defined by the appended claims.

What is claimed is:

1. A process for producing polyolefins comprising polymerizing or copolymerizing olefins in the presence of a particulate catalyst comprised of titanium halide supported on an aluminum and magnesium phosphate gel.

2. The process of claim 1 wherein said titanium halide is titanium tetrachloride.

3. The process of claim 1 wherein said catalyst is prepared by forming a particulate gel containing aluminum and magnesium phosphates, calcining said gel and contacting said calcined gel with titanium halide to obtain said catalyst.

4. The process of claim 2 wherein said catalyst has a weight ratio of titanium tetrachloride to aluminum and magnesium phosphate gel in the range of from about 0.4:1 to about 1.4:1.

5. The process of claim 1 wherein said catalyst is further includes a magnesium dialkyl compound of the formula MgR''$_2$ wherein R'' represents an alkyl radical having from 2 to 8 carbon atoms supported on said gel.

6. The process of claim 5 wherein said titanium halide is titanium tetrachloride and said magnesium dialkyl compound is magnesium dibutyl.

7. The process of claim 3 wherein the weight ratio of aluminum to magnesium in said gel is in the range of from about 100:1 to about 1:1, the weight ratio of phosphorus to aluminum is in the range of from about 0.5:1 to about 2:1 and the weight ratio of phosphorous to magnesium is in the range of from 100:1 to about 0.5:1.

8. The process of claim 7 wherein said particulate gel containing aluminum and magnesium phosphates is formed by combining an aluminum salt, a magnesium salt and a monobasic phosphate compound in an aqueous solvent to form a solution, precipitating a gel from said solution by adding a base thereto and recovering and drying the gel.

9. The process of claim 8 wherein said aluminum salt is aluminum nitrate, said magnesium salt is magnesium chloride, said monobasic phosphate is monobasic ammonium phosphate and said base is ammonium hydroxide.

10. The process of claim 7 wherein said particulate gel containing aluminum and magnesium phosphates is formed by combining in a hydrocarbon solvent an aluminum alkoxide compound of the formula Al(RO)$_3$ wherein R represents an alkyl radical having from 2 to 8 carbon atoms and a magnesium alkoxide compound of the formula Mg(R'O)$_2$ wherein R' represents an alkyl radical having from 2 to 8 carbon atoms to form a solution, precipitating a gel from said solution by adding phosphoric acid thereto and recovering and drying the gel.

11. The process of claim 10 wherein said aluminum alkoxide compound is aluminum triethoxide and said magnesium alkoxide compound is magnesium diethoxide.

12. The process of claim 3 wherein the step of calcining said gel is carried out in air at a temperature in the range of from about 150° C. to about 300° C. for a time period in the range of from about 1 hour to about 10 hours.

13. The process of claim 3 wherein said calcined gel is contacted with titanium halide by dispersing said calcined gel in a hydrocarbon liquid, adding titanium halide to said dispersion, heating and refluxing said dispersion, and separating and drying the resulting catalyst.

14. The process of claim 13 wherein said titanium halide is titanium tetrachloride.

15. The process of claim 3 wherein said calcined gel is contacted with titanium halide by contacting said gel in a fluidized bed with titanium halide vapor.

16. The process of claim 15 wherein said titanium halide is titanium tetrachloride.

* * * * *